(12) United States Patent
Yokoyama et al.

(10) Patent No.: US 10,222,395 B2
(45) Date of Patent: Mar. 5, 2019

(54) SERVER APPARATUS THAT DETERMINES WHETHER SHAKING IS DUE TO AN EARTHQUAKE

(71) Applicant: Panasonic Intellectual Property Corporation of America, Torrance, CA (US)

(72) Inventors: Ryo Yokoyama, Kanagawa (JP); Akiko Takamiya, Osaka (JP); Hayashi Ito, Chiba (JP); Hitoshi Nomura, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 636 days.

(21) Appl. No.: 14/663,111

(22) Filed: Mar. 19, 2015

(65) Prior Publication Data

US 2015/0276954 A1    Oct. 1, 2015

(30) Foreign Application Priority Data

Mar. 31, 2014 (JP) ................................ 2014-072228

(51) Int. Cl.
| | | |
|---|---|---|
| H04M 11/04 | (2006.01) |
| H04M 1/725 | (2006.01) |
| H04M 3/42 | (2006.01) |
| H04L 12/58 | (2006.01) |
| G01P 15/00 | (2006.01) |
| G08B 21/10 | (2006.01) |

(52) U.S. Cl.
CPC .............. *G01P 15/00* (2013.01); *G08B 21/10* (2013.01)

(58) Field of Classification Search
CPC ....... H04W 4/008; H04W 4/02; H04W 4/021; H04W 4/025; H04W 4/04; H04W 4/043; H04W 4/06; H04W 4/16–4/22
See application file for complete search history.

(56) References Cited

U.S. PATENT DOCUMENTS 8,464,181 B1 *  6/2013  Bailiang .............. G09B 29/106
                                                       715/848
2008/0285385 A1 * 11/2008  Cherry .................. G01V 1/008
                                                       367/76

(Continued)

FOREIGN PATENT DOCUMENTS

| JP | 2009-293934 A | 12/2009 |
| JP | 2012-037436 A |  2/2012 |
| JP | 2013-254239   | 12/2013 |

*Primary Examiner* — San Htun
(74) *Attorney, Agent, or Firm* — Greenblum & Bernstein, P.L.C.

(57) ABSTRACT

A device has a storage and an information processor. The storage stores presentation information received from a server apparatus. The information processor reads the presentation information from the storage, and controls screen display on a notifier, based on the read presentation information. The screen display on the notifier includes map information of a predetermined region, information about at least one unit representing an occupied part in a unit ownership building that exists in the predetermined region or a building that exists in the predetermined region and that is a building other than a unit ownership building, and shaking-intensity information for each unit.

10 Claims, 16 Drawing Sheets

(56) References Cited

U.S. PATENT DOCUMENTS

| | | | |
|---|---|---|---|
| 2009/0222210 A1* | 9/2009 | Meskouris | G01M 7/00 702/14 |
| 2009/0326821 A1* | 12/2009 | Yomoda | G01V 1/008 702/2 |
| 2013/0046475 A1* | 2/2013 | Lin | G01V 1/008 702/15 |

* cited by examiner

FIG. 4

| DEVICE ID | LOCATION INFORMATION | SHAKING-INTENSITY INFORMATION |
|---|---|---|
| 001 | ROOM 304, ABC HEIGHTS, 1-10-1, AKASAKA, MINATO-KU, TOKYO | |
| 002 | LOT A, 4TH FL., TANAKA BLDG., 2-10-34, AKASAKA, MINATO-KU, TOKYO | |
| 003 | 2-16-27, AKASAKA, MINATO-KU, TOKYO | |
| ... | ... | ... |

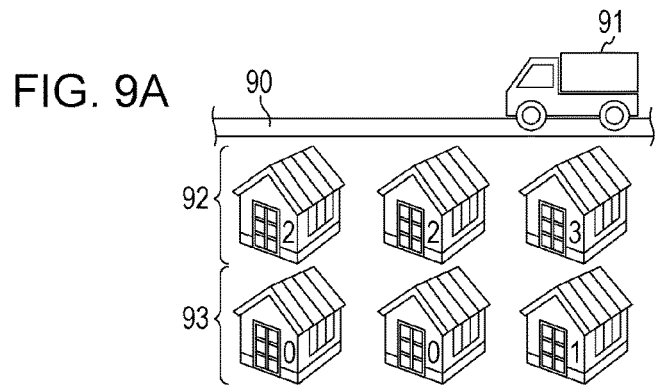
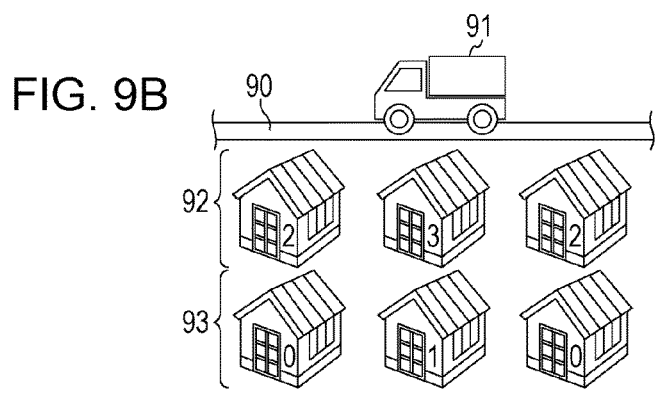
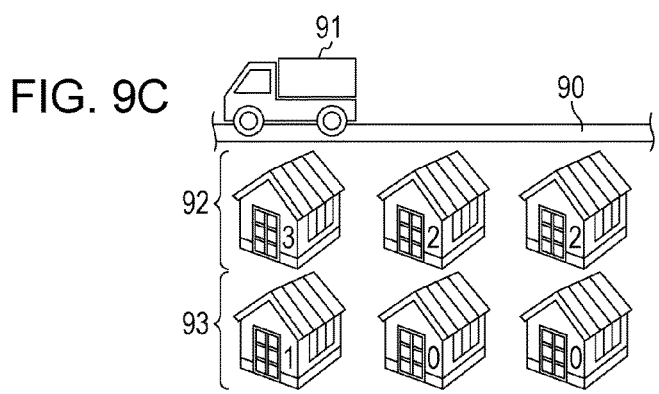

SERVER APPARATUS THAT DETERMINES WHETHER SHAKING IS DUE TO AN EARTHQUAKE

BACKGROUND

1. Technical Field

The present disclosure relates to a terminal device that provides a user with information when an earthquake occurs, a server apparatus, an information presentation method, and a storage medium storing a computer program.

2. Description of the Related Art

Heretofore, a system that provides a user with information when an earthquake occurs has been known (see, e.g., Japanese Unexamined Patent Application Publication No. 2013-254239 (hereinafter referred to as "Patent Document 1")). In the system disclosed in Patent Document 1, acceleration sensors are installed on a plurality of floors in a building, a recording unit installed in the building analyzes data from the acceleration sensors to obtain the shaking intensities of the floors, and an indicator installed in the building displays the obtained shaking intensities. This allows a user in the building to know the shaking intensities of the respective floors during the occurrence of an earthquake.

SUMMARY

In one general aspect, the techniques disclosed here feature a terminal device according to one aspect of the present disclosure. The terminal device includes: a storage that stores presentation information used for screen display; and an information processor that reads the presentation information from the storage and controls the screen display based on the presentation information. The screen display includes map information of a predetermined region, information about at least one unit representing an occupied part in a unit ownership building that exists in the predetermined region or a building that exists in the predetermined region and that is a building other than a unit ownership building, and shaking-intensity information for each unit.

It should be noted that general or specific embodiments may be implemented as a system, a method, an integrated circuit, a computer program, a storage medium, or any selective combination thereof.

According to the present disclosure, even when a user is away from a building during the occurrence of an earthquake, he or she can check the shaking intensity for each unit in the building.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 4 is a table illustrating one example of location information according to the present embodiment;

FIG. 9A is a schematic view illustrating the fourth modification according to the present embodiment;

FIG. 9B is a schematic view illustrating the fourth modification according to the present embodiment;

FIG. 9C is a schematic view illustrating the fourth modification according to the present embodiment;

DETAILED DESCRIPTION

Figure 1A:
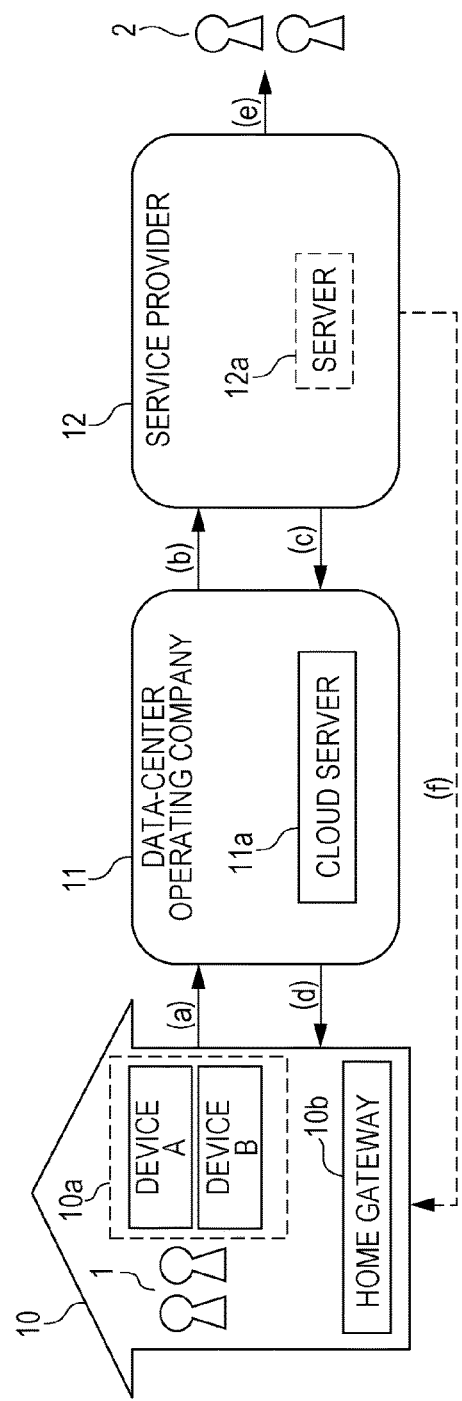
FIG. 1A is a diagram illustrating an overview of an information presentation system according to the present embodiment.

First, a description will be given of items that the present inventors have studied in order to realize the aspects according to the present disclosure.

(Findings Underlying Present Disclosure)

In the system disclosed in Patent Document 1, since a shaking intensity is displayed on an indicator in a building, a user who is away from the building when an earthquake occurs cannot check the shaking intensity. Also, in the system in Patent Document 1, since the shaking intensity for each floor is displayed, the user cannot check a shaking intensity for each unit (e.g., a home or an office of the entity for which he or she works) in a building.

The present disclosure provides a terminal device that allows a user to check a shaking intensity for each unit in a building even when he or she is away from the building during the occurrence of an earthquake, a server apparatus, an information presentation method, and a storage medium storing a computer program.

A terminal device according to one aspect of the present disclosure includes: a storage that stores presentation information used for screen display; and an information processor that reads the presentation information from the storage and controls the screen display based on the presentation information. The screen display includes map information of a predetermined region, information about at least one unit representing an occupied part in a unit ownership building that exists in the predetermined region or a building that exists in the predetermined region and that is a building other than a unit ownership building, and shaking-intensity information for each unit.

With this arrangement, even when a user is away from a building during the occurrence of an earthquake, he or she can check the shaking intensity for each building unit.

A server apparatus according to one aspect of the present disclosure includes: a storage that stores map information of a predetermined region, location information indicating a location of at least one unit representing an occupied part in a unit ownership building that exists in the predetermined region or a building that exists in the predetermined region and that is a building other than a unit ownership building, and shaking-intensity information indicating a shaking intensity for each unit, the shaking intensity being calculated based on a shaking-detection result obtained by a sensor installed at each unit; a generator that generates first control information, based on the map information, the location information, and the shaking-intensity information read from the storage; and a transmitter that transmits the first control information, generated by the generator, to a terminal device through a network. Screen display of the terminal device is controlled based on the first control information transmitted by the transmitter. And the screen display of the terminal device may include the map information, the information about the at least one unit representing the occupied part or the building, and the shaking-intensity information for each unit.

With this arrangement, even when the user is away from a building during the occurrence of an earthquake, information regarding a shaking intensity for each building unit can be presented to a terminal device used by the user.

In the server apparatus according to one aspect of the present disclosure, the generator may determine a building whose collapse risk is high, based on the shaking-intensity information and may generate second control information, based on the map information, the location information, and the shaking-intensity information read from the storage and information about the building whose collapse risk is high. The transmitter may transmit the second control information, generated by the generator, to the terminal device through the network, and screen display of the terminal device may be controlled based on the second control information transmitted by the transmitter. And the screen display of the terminal device may include the map information, the information about the at least one unit representing the occupied part or the building, the shaking-intensity information for each unit, and the information about the building whose collapse risk is high.

With this arrangement, the information about the building whose collapse risk is high can be presented to the user of the terminal device.

In the server apparatus according to one aspect of the present disclosure, the generator may determine whether or not shaking that has occurred is due to an earthquake, based on the shaking-intensity information, may generate the first control information or the second control information, upon determining that the shaking is due to an earthquake, and may determine, upon determining that the shaking is not due to an earthquake, a unit where the shaking has occurred, based on the shaking-intensity information, and generates third control information, based on a result of the unit determination. The transmitter may transmit the third control information to the terminal device, upon determining that the shaking is not due to an earthquake. Screen display of the terminal device may be controlled based on the third control information. And the screen display of the terminal device may include information indicating that the shaking is not due to an earthquake and information about the unit where the shaking has occurred.

With this arrangement, when shaking occurs, information regarding whether or not it is due to an earthquake can be presented to the user of the terminal device.

In the server apparatus according to one aspect of the present disclosure, upon determining that the shaking is not due to an earthquake, the generator may determine that a first unit is the unit where the shaking has occurred, when a first shaking intensity calculated for the first unit is higher than a second shaking intensity calculated for a second unit that exists in surroundings of the first unit.

With this arrangement, the server apparatus can determine that the source of the shaking is the first unit.

The server apparatus according to one aspect of the present disclosure may further include: a receiver that receives shaking-detection result information indicating the shaking-detection result for each unit through the network; and a calculator that calculates the shaking intensity for each unit, based on the shaking-detection result information.

With this arrangement, the server apparatus can calculate a shaking intensity for each unit.

In the server apparatus according to one aspect of the present disclosure, the screen display may include information indicating a magnitude of a change with time in the shaking intensity for each unit.

With this arrangement, information regarding a change with time in the peak of shaking can be presented to the user of the terminal device.

In the server apparatus according to one aspect of the present disclosure, a processor may be used to perform at least one of the storage, the generator, and the transmitter.

With this arrangement, at least one of the storage, the generator, and the transmitter can be realized using a processor.

An information presentation method according to one aspect of the present disclosure includes: reading, from a predetermined storage device, map information of a predetermined region, location information indicating a location of at least one unit representing an occupied part in a unit ownership building that exists in the predetermined region or a building that exists in the predetermined region and that is a building other than a unit ownership building, and shaking-intensity information indicating a shaking intensity for each unit, the shaking intensity being calculated based on a shaking-detection result obtained by a sensor installed at each unit; generating control information, based on the map information, the location information, and the shaking-intensity information read from the predetermined storage device; and transmitting the control information, generated in the generating, to a terminal device through a network.

Screen display of the terminal device may be controlled based on the third control information transmitted in the transmitting. And the screen display of the terminal may include the map information, the information about the at least one unit representing the occupied part or the building, and the shaking-intensity information for each unit.

With this arrangement, even when the user is away from a building during the occurrence of an earthquake, information regarding a shaking intensity for each building unit can be presented to a terminal device used by the user.

In the information presentation method according to one aspect of the present disclosure, a processor may be used to perform at least one of the reading the location information and the shaking-intensity information, the generating the control information, and the transmitting the control information.

With this arrangement, at least one of the reading the location information and the shaking-intensity information, the generating the control information, and the transmitting the control information can be realized using a processor.

A storage medium storing a computer program according to one aspect of the present disclosure is a non-transitory storage medium storing a computer-readable computer program. The computer program causes a computer to execute: reading, from a predetermined storage device, map information of a predetermined region, location information indicating a location of at least one unit representing an occupied part in a unit ownership building that exists in the predetermined region or a building that exists in the predetermined region and that is a building other than a unit ownership building, and shaking-intensity information indicating a shaking intensity for each unit, the shaking intensity being calculated based on a shaking-detection result obtained by a sensor installed at each unit; generating control information, based on the map information, the location information, and the shaking-intensity information read from the predetermined storage device; and transmitting the control information generated in the generating to a terminal device. Screen display of the terminal device is controlled based on the third control information transmitted in the transmitting. And the screen display of the terminal device may include the map information, the information about the at least one unit representing the occupied part or the building, and the shaking-intensity information for each unit.

With this arrangement, even when the user is away from a building during the occurrence of an earthquake, information regarding a shaking intensity for each building unit can be presented to a terminal device used by the user.

Embodiment

An embodiment of the present disclosure will be described below in detail with reference to the accompanying drawings.

<Overall Picture of Service to be Provided>

Figure 1B:
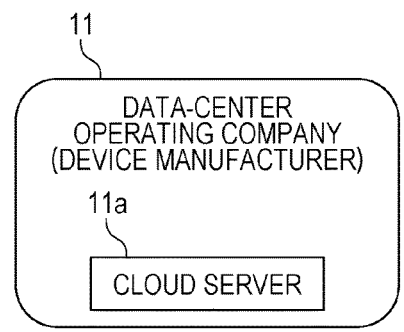
FIG. 1B is a diagram illustrating one example when a device manufacturer performs management and so on of a cloud server in the information presentation system according to the present embodiment.
Figure 1C:
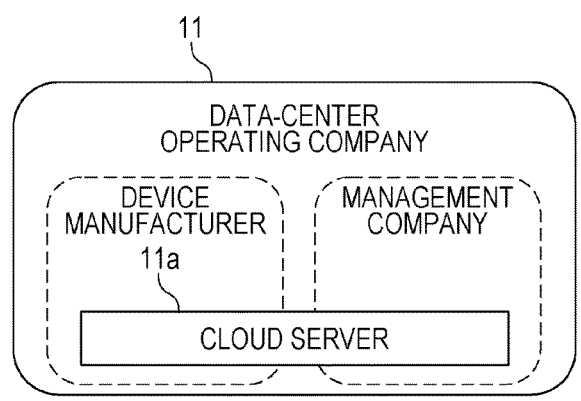
FIG. 1C is a diagram illustrating one example of a case in which, in the information presentation system according to the present embodiment, a device manufacturer and another management company operate a cloud server.

First, an overall picture of a service to be provided according to the present embodiment will be described with reference to FIGS. 1A to 1C. FIGS. 1A to 1C are diagrams illustrating an overview of an information presentation system in the present embodiment. FIG. 1A illustrates an overall picture of an information presentation system in the present embodiment.

A group 10 is, for example, a company, an entity, or a household, and the scale thereof is not limited. The group 10 has a plurality of devices 10a (e.g., devices 100 and 300 described below), including devices A and B, and a home gateway 10b.

The plurality of devices 10a can connect to the Internet and include, for example, a smartphone, a tablet computer, a personal computer (PC), a television (TV), and critical infrastructure equipment. Examples of the critical infrastructure equipment include a power distribution board, an electricity meter, a gas meter, and a water meter. The critical infrastructure equipment has an acceleration sensor that detects acceleration during the occurrence of shaking.

The plurality of devices 10a may be any equipment that can connect to the Internet via the home gateway 10b even if they are not capable of connecting to the Internet on their own.

The group 10 includes users 1 that use the plurality of devices 10a. The users 1 are, for example, users that can use an information-presenting service. The information-presenting service is a service that provides, when an earthquake occurs, presentation information to at least one of the devices 10a used by the users 1. The "presentation information" as used herein refers to, for example, information that indicates a shaking intensity for each unit in a building that exists in a region specified by the user 1. The "unit in a building" as used herein refers to an occupied part in a unit ownership building (e.g., one unit corresponding to an occupied part (such as an apartment or a condominium) in a multi-unit residential complex or one lot corresponding to an occupied part in an office building) that exists in a predetermined region or a building (e.g., a unit corresponding to a single-family detached house) that exists in a predetermined region and that is a building other than a unit ownership building.

A data-center operating company 11 has a cloud server 11a. The cloud server 11a is a virtualization server that cooperates with various types of device through the Internet. The data-center operating company 11 performs data management, management of the cloud server 11a, operations of a data center that performs the management, and so on. Details of a service provided by the data-center operating company 11 are described later.

In this case, the data-center operating company 11 is not limited to a company that performs only data management, operations of the cloud server 11a, or the like. For example, when a device manufacturer that develops and manufactures one of the devices 10a also performs data management, management of the cloud server 11a, and so on, this device manufacturer corresponds to the data-center operating company 11 (see FIG. 1B).

The data-center operating company 11 is not limited to a single company. For example, when the device manufacturer and another management company perform data management and operation of the cloud server 11a in cooperation with each other or in a shared manner, one of or both the device manufacturer and the other management company is/are assumed to correspond to the data-center operating company 11 (see FIG. 1C).

A service provider 12 has a server 12a (e.g., a server apparatus 200, described below). The service provider 12 may also have a plurality of servers 12a, depending on the purpose.

In the service described above, the home gateway 10b is not essential. For example, when the cloud server 11a performs all data management, the home gateway 10b may be eliminated. There are also cases in which the devices 10a do not include any device that is incapable of connecting to the Internet on their own, as in a case in which all the devices in the group 10 are connected to the Internet.

Next, a description will be given of a flow of information in the above-described service. First, the device A or B in the group 10 transmits information (e.g., shaking-sensing result information, described below) to the cloud server 11a in the data-center operating company 11. The cloud server 11a aggregates the information from the device A or B (as indicated by (a) in FIG. 1A).

The information may also be directly supplied from the devices 10a to the cloud server 11a through the Internet. The information from the devices 10a may also be temporarily aggregated in the home gateway 10b and be supplied from the home gateway 10b to the cloud server 11a.

Next, the cloud server 11a in the data-center operating company 11 supplies the aggregated information to the service provider 12 in a certain unit of information. The certain unit of information may be a unit with which the data-center operating company 11 can organize the aggregated information and can supply it to the service provider 12 or may be a unit requested by the service provider 12. The certain unit of information may be variable, and there are also cases in which the amount of information to be supplied changes depending on the situation.

The information aggregated in the cloud server 11a is stored in the server 12a of the service provider 12, as needed (as indicated by (b) in FIG. 1A). The service provider 12 then organizes the stored information into information (e.g., presentation information, described below) that suits a service to be provided to users, and provides the service to the users. The users to which the service is provided may be the users 1 of the device 10a or may be users 2 outside the group 10.

A method for supplying the service to the users may be, for example, a method in which the service is directly supplied from the service provider 12 to the users (as indicated by (f) and (e) in FIG. 1A). For example, the method for supplying the service to the users may be, for example, a method in which the service is supplied to the users after going through the cloud server 11a in the data-center operating company 11 again (as indicated by (c) and (d) in FIG. 1A). The cloud server 11a in the data-center operating company 11 may also organize the aggregated information into information that suits the service to be provided to the users, and may provide the service to the users.

The users 1 and the users 2 may be the same or may be different from each other.

<Configuration of Information Presentation System>

Figure 2:
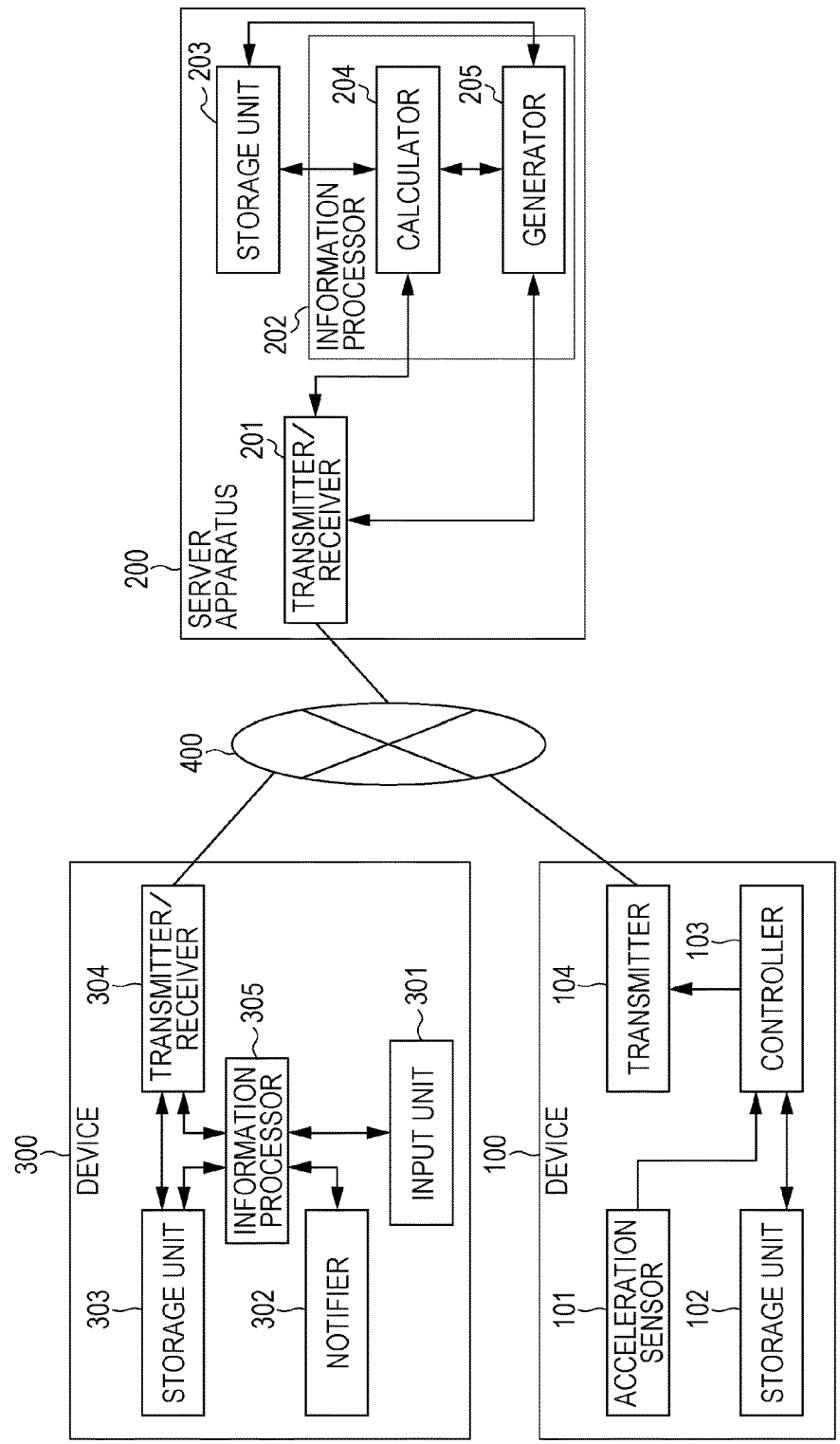
FIG. 2 is a block diagram illustrating one example of the configuration of the information presentation system according to the present embodiment.

Next, a configuration example of an information presentation system according to the present embodiment will be described with reference to FIG. 2. FIG. 2 is a block diagram illustrating one example of the configuration of the information presentation system according to the present embodiment.

As illustrated in FIG. 2, the information presentation system has a device 100, a server apparatus 200, and a device 300.

In FIG. 2, the device 100 and the server apparatus 200 are connected to each other through a network 400. The server apparatus 200 and the device 300 are also connected to each other through the network 400. The network 400 may be a wireless network, a wired network, or a network including both a wired network and a wireless network.

Although only one device 100 is illustrated in FIG. 2, the device 100 exists in each unit in a building, and it is thus assumed that there are two or more devices 100. Also, although only one device 300 is illustrated in FIG. 2, the number of devices 300 may be two or more.

First, a description will be given of the configuration of the device 100.

The device 100 is, for example, critical infrastructure equipment, such as a power distribution board, an electricity meter, a gas meter, or a water meter. The device 100 may also be battery equipment, such as a solar cell or a battery. In the present embodiment, it is assumed that one piece of critical infrastructure equipment or battery equipment is installed in each unit in a building. As described above, the "unit in a building" as used herein refers to an occupied part in a unit ownership building (e.g., one unit corresponding to an occupied part in a multi-unit residential complex or one lot corresponding to an occupied part in an office building) that exists in a predetermined region or a building (e.g., a unit corresponding to a single-family detached house) that exists in a predetermined region and that is a building other than a unit ownership building. Such a building unit is hereinafter referred to as "one unit".

The device 100 has an acceleration sensor 101, a storage unit 102, a controller 103, and a transmitter 104.

The acceleration sensor 101 is built into the device 100 to detect acceleration.

For example, the acceleration sensor 101 detects acceleration when shaking occurs and outputs, to the controller 103, shaking-detection result information (hereinafter referred to as "acceleration information") indicating a detection result of the acceleration.

The storage unit 102 is a storage device, such as a memory or a hard-disk device.

For example, the storage unit 102 stores identification information (hereinafter referred to as a "device ID") of the device 100.

The controller 103 is a control device, such as a processor, that executes various types of information processing.

For example, upon input of the acceleration information from the acceleration sensor 101, the controller 103 reads the device ID from the storage unit 102. The controller 103 then causes the transmitter 104 to execute transmission of the acceleration information and the device ID to the server apparatus 200. The acceleration information and the device ID are collectively referred to as "shaking-sensing result information".

The transmitter 104 serves as a communication interface that transmits information to the server apparatus 200.

For example, the transmitter 104 transmits the shaking-sensing result information to the server apparatus 200.

The configuration of the device 100 has been described thus far.

Next, a description will be given of the configuration of the server apparatus 200.

The server apparatus 200 is an information processing apparatus that realizes the information-presenting service by generating presentation information (one example of third control information) on the basis of the shaking-sensing result information from the device 100 and transmitting the generated presentation information to the device 300.

The server apparatus 200 includes a transmitter/receiver 201, an information processor 202, and a storage unit 203.

The transmitter/receiver 201 serves as a communication interface that transmits information to other apparatuses and devices and that receives information transmitted from other apparatuses and devices.

For example, the transmitter/receiver 201 receives the shaking-sensing result information from the device 100 through the network 400.

Also, for example, the transmitter/receiver 201 transmits the presentation information, generated by a generator 205 included in the information processor 202, to the device 300 through the network 400.

The information processor 202 is a control device, such as a processor, that executes various types of information processing. The information processor 202 includes a calculator 204 and the generator 205.

The calculator 204 calculates shaking intensities for the respective units in buildings on the basis of the shaking-sensing result information that the transmitter/receiver 201 received from the devices 100 (more specifically, the acceleration information included in the shaking-sensing result information) and registers the shaking intensities in the storage unit 203. The "shaking intensities" as used herein refers to, for example, measured shaking intensities calculated based on acceleration waveforms or shaking intensity scales or the like converted from measured shaking intensities. In the present embodiment, a case in which the shaking-intensity information is a shaking intensity scale will be described below by way example. Since methods for calculating the measurement shaking intensities and the shaking intensity scales are known, descriptions thereof are not given hereinafter.

When the calculator 204 calculates the shaking intensities, the generator 205 reads location information and shaking-intensity information corresponding thereto from the storage unit 203. The location information indicates the location of one unit. Details of the location information are described later with reference to FIG. 4. The shaking-intensity information indicates the shaking intensity of one unit which was calculated by the calculator 204.

Also, the generator 205 reads map information and building image information from the storage unit 203. The "map information" as used herein refers to information showing an image of a map of a predetermined region (e.g., a predetermined region in countries, including Japan, around the world). The location information is associated with a site on the map. The term "building image information" refers to information showing an image of a building that exists in a predetermined region shown by the map information. The building image information is associated with the location information described above. When a building of interest is a unit ownership building (which is a building in which units are independently owned by owners, such as an apartment building or an office building), the building image information includes an image of the entire unit ownership building and an image of an all-unit layout. The all-unit layout is a drawing showing a layout of each unit for each floor in a unit ownership building. When the building is a building (e.g., a single-family detached house) other than a unit ownership building, the building image information includes an image of the entire building.

The generator 205 then generates presentation information on the basis of the above-described location information, shaking-intensity information, map information, and building image information. When displayed at the device 300, this presentation information shows the units in buildings that exist in the predetermined region on the map for the predetermined region and also indicates the pieces of shaking-intensity information for the units in the buildings. Since the device 300 performs screen display on the basis of the presentation information, the presentation information can be said to be control information for controlling the screen display at the device 300. An example of display of the presentation information is described later with reference to FIG. 5.

After generating the presentation information, the generator 205 causes the transmitter/receiver 201 to execute transmission of the presentation information to the device 300.

Figure 3:
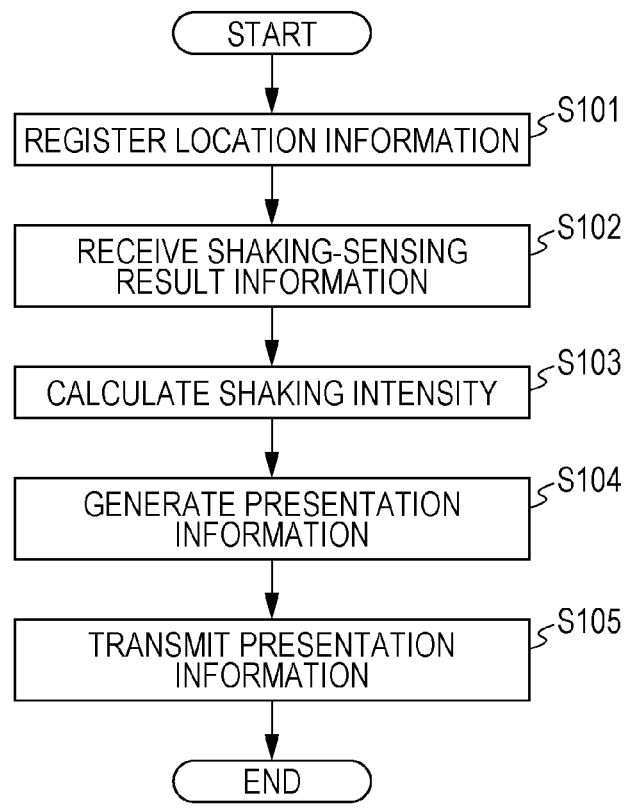
FIG. 3 is a flowchart illustrating one example of the operation of a server apparatus according to the present embodiment.

Details of the processing performed by the generator 205 are described later with reference to a flowchart in FIG. 3.

The storage unit 203 is a storage device, such as a memory or a hard-disk device.

For example, the storage unit 203 stores the above-described location information. For example, the location information is pre-registered in the storage unit 203 in association with the device ID. This registration is performed by, for example, an administrator of the server apparatus 200 or the like. When the calculator 204 calculates a shaking intensity, the shaking-intensity information indicating the shaking intensity is registered in association with the corresponding location information.

For example, the storage unit 203 stores the above-described map information. For example, an administrator or the like of the server apparatus 200 registers the map information in the storage unit 203.

Also, for example, the storage unit 203 stores the above-described building image information. For example, an administrator of the server apparatus 200 or the like registers the building image information in the storage unit 203.

The configuration of the server apparatus 200 has been described thus far.

Next, a description will be given of the configuration of the device 300.

The device 300 is an information processing apparatus (a terminal device) that can use the information-presenting service provided by the server apparatus 200. Examples of the device 300 include a smartphone, a tablet computer, a PC, and a TV.

The device 300 has an input unit 301, a notifier 302, a storage unit 303, a transmitter/receiver 304, and an information processor 305.

The input unit 301 is an input device, such as a button and/or a touch panel.

The notifier 302 is a display device, such as a display, or an output device, such as a speaker.

For example, the notifier 302 displays the above-described presentation information. An example of display of the presentation information is described later with reference to FIG. 5.

The storage unit 303 is a storage device, such as a memory or a hard-disk device.

For example, the storage unit 303 stores the presentation information received from the server apparatus 200.

The transmitter/receiver 304 serves as a communication interface that transmits information to another apparatus or device and that receives information transmitted from another apparatus or device.

For example, the transmitter/receiver 304 receives the presentation information from the server apparatus 200 through the network 400.

The information processor 305 is a control device, such as a processor, that executes various types of information processing.

For example, the information processor 305 causes the storage unit 303 to temporarily store the presentation information that the transmitter/receiver 304 received from the server apparatus 200. The information processor 305 then reads the presentation information from the storage unit 303 at a predetermined timing and controls the screen display on the notifier 302 on the basis of the presentation information.

The configuration of the device 300 has been described thus far.

<Operation of Server Apparatus 200>

Next, an example operation of the server apparatus 200 in the information presentation system according to the present embodiment will be described with reference to FIG. 3. FIG. 3 is a flowchart illustrating an example operation of the server apparatus 200 according to the present embodiment.

In step S101, for example, an administrator of the server apparatus 200 or the like registers the location information in the storage unit 203.

Now, an example of the location information will be described with reference to FIG. 4. FIG. 4 is a table illustrating one example of the location information registered in the storage unit 203.

As illustrated in FIG. 4, the location information is stored in the storage unit 203 in association with the device ID and the shaking-intensity information.

As described above, each device ID is identification information of the corresponding device 100 that is critical infrastructure equipment installed in one unit.

The location information is information indicating the location of one unit, as described above. Although each piece of location information is an address in this example, the location information is not limited thereto. In FIG. 4, the location information corresponding to a device ID "001" indicates, for example, the location of one room (an occupied part) in an apartment building. The location information corresponding to a device ID "002" indicates, for example, one lot (an occupied part) in an office building. The location information corresponding to a device ID "003" indicates, for example, the location of a single-family detached house.

The shaking-intensity information (or the acceleration information included in the shaking-intensity information) indicates the shaking intensity of one unit which is calculated by the calculator 204, as described above. In this example, since a shaking-intensity calculation (in step S103 described below) has not been performed, the shaking-intensity information corresponding to each device ID is blank.

One example of the location information has been described above thus far. Now, a description will be given with reference back to the flowchart in FIG. 3.

When an earthquake occurs, in step S102, the transmitter/receiver 201 receives the shaking-sensing result information from the device 100.

In step S103, the calculator 204 calculates a shaking intensity on the basis of the acceleration information included in the shaking-sensing result information. On the basis of the device ID included in the shaking-sensing result information, the calculator 204 registers the calculated shaking intensity in association with the location information stored in the storage unit 203. For example, when the shaking intensity calculated based on the acceleration information included in the shaking-sensing result information in conjunction with the device ID "001" is "3", the calculator 204 registers shaking-intensity information "3" in the table in FIG. 4 in association with the device ID "001". As described above, when an earthquake occurs, pieces of shaking-intensity information calculated for respective units in buildings are registered in association with the corresponding pieces of pre-registered location information.

In step S104, the generator 205 generates presentation information on the basis of the shaking-intensity information, the location information, the map information, and the building image information read from the storage unit 203.

Now, a description will be given of one example of processing for generating the presentation information.

First, when the shaking-intensity information is registered in the storage unit 203, the generator 205 reads the shaking-intensity information and the location information corresponding thereto from the storage unit 203. The generator 205 also reads the map information and the building image information from the storage unit 203. The map information read in this case is, for example, the map information for a region specified by the user of the device 300. Now, as an example, it is assumed that "Akasaka, Minato-ku, Tokyo" is specified by the user and the map information indicating this region is read. The building image information read in this case is, for example, the building image information of a building that exists in a predetermined region shown by the map information. In this case, as an example, it is assumed that the building image information indicating buildings located in "Akasaka, Minato-ku, Tokyo" has been read.

Next, the generator 205 identifies pieces of location information for the predetermined region shown by the map information, the pieces of location information being read from the storage unit 203, and generates an image so that, when the map corresponding to the map information is displayed at the device 300, the pieces of shaking-intensity information corresponding to the pieces of location information are displayed for the respective units in the buildings.

Now, by way of example, a description will be given of an example of a case in which the location information and the shaking-intensity information corresponding to the device ID "001", the map information for "Akasaka, Minato-ku, Tokyo", and the building image information for buildings located in "Akasaka, Minato-ku, Tokyo" are read. A specific example will be described below for each type of building.

First, a description will be given of a case in which, for example, a building of interest is an apartment building (e.g., a case of the device ID "001" in FIG. 4). In this case, the generator 205 identifies location information "1-10-1, Akasaka, Minato-ku, Tokyo" in an image (hereinafter referred to as a "map image") showing a map of "Akasaka, Minato-ku, Tokyo". The generator 205 then superimposes images (an image of an entire unit ownership building and an image of an all-unit layout), included in the building image information, on the position "1-10-1, Akasaka, Minato-ku, Tokyo" on the map image. The generator 205 then superimposes an image indicating shaking-intensity information "3" on a position corresponding to "room 304" in the image of the all-unit layout. Similarly, images indicating shaking-intensity information for units other than for the unit "room 304" are superimposed on the all-unit layout image. An image generated in such a manner is displayed, for example, like an image 51 described below and illustrated in FIG. 5.

Next, a description will be given of a case in which, for example, the building of interest is an office building (e.g., a case of the device ID "002" in FIG. 4). In this case, the generator 205 identifies location information "2-10-34, Akasaka, Minato-ku, Tokyo" in the map image for "Akasaka, Minato-ku, Tokyo". The generator 205 then superimposes an image of the entire unit ownership building and an image of the all-unit layout on the position "2-10-34, Akasaka, Minato-ku, Tokyo" in the map image. The generator 205 then superimposes an image indicating, for example, shaking-intensity information "4" on a position corresponding to "lot A on the 4th floor" in the image of the all-unit layout. Images indicating shaking-intensity information for units other than for the unit "lot A on the 4th floor" are superimposed on the all-unit layout image. An image generated in such a manner is displayed, for example, like an image 52 described below and illustrated in FIG. 5.

Next, for example, a description will be given of a case in which the building of interest is a single-family detached house (a case of the device ID "003" in FIG. 4). In this case, the generator 205 identifies location information "2-16-27, Akasaka, Minato-ku, Tokyo" in the map image for "Akasaka, Minato-ku, Tokyo". The generator 205 then superimposes an image of the entire building on the position "2-16-27, Akasaka, Minato-ku, Tokyo" in the map image. The generator 205 then superimposes an image indicating, for example, shaking-intensity information "5" on the image of the entire building. An image generated in such a manner is displayed, for example, like an image 53 described below and illustrated in FIG. 5.

As described above, image information that shows shaking-intensity information for units in buildings that exist in a predetermined region is generated in a map for a predetermined region. This image information serves as the presentation information.

One example of the processing for generating the presentation information has been described thus far.

In step S105, the generator 205 causes the transmitter/receiver 201 to execute transmission of the generated presentation information to the device 300 through the network 400.

The above-described presentation information is received by the device 300 and is displayed. Since the presentation-information display processing performed by the device 300 has already been described above, the description is not given hereinafter.

Figure 5:
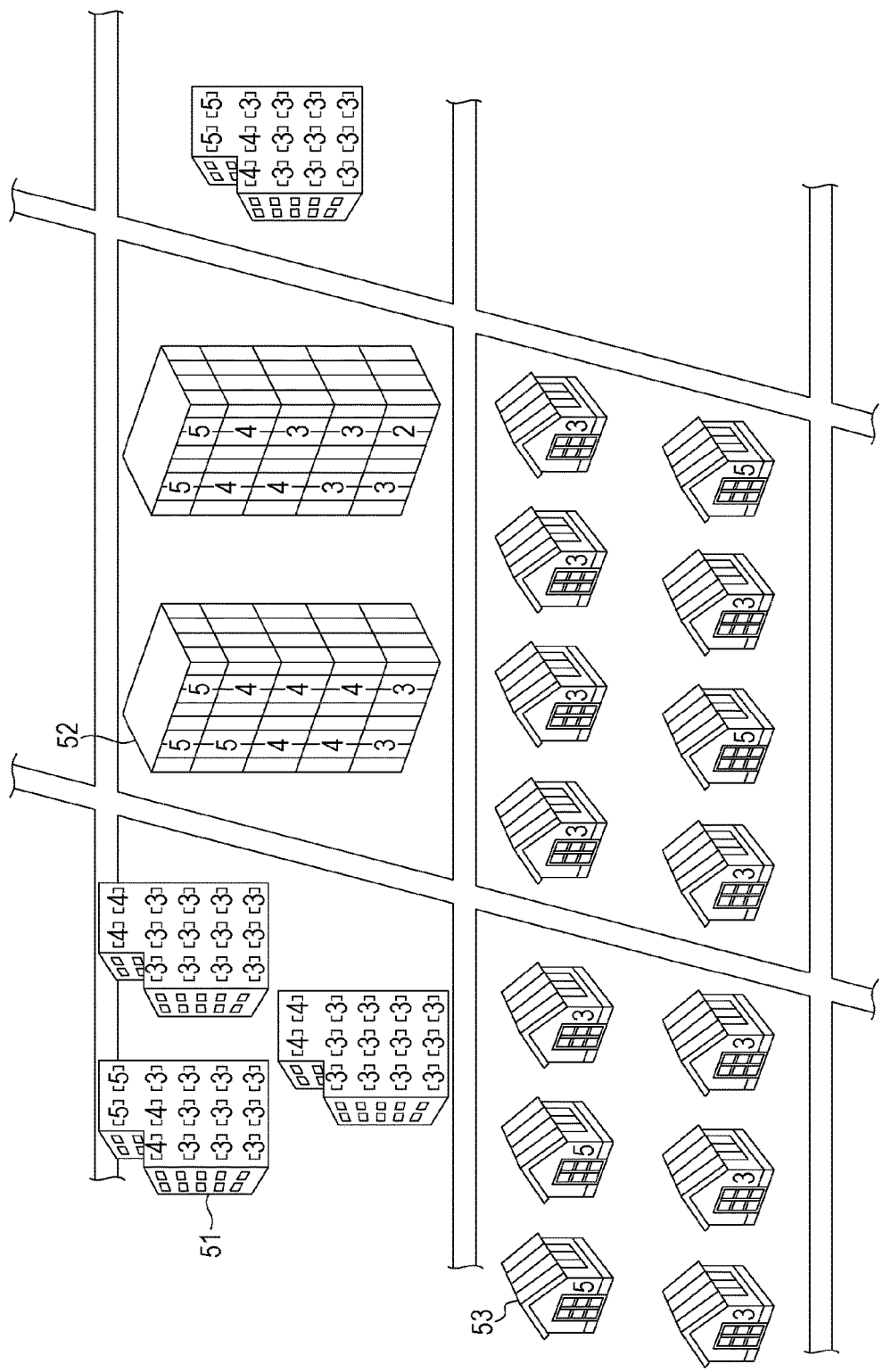
FIG. 5 is a diagram illustrating an example of display of presentation information according to the present embodiment.

Now, an example of display of the presentation information on the notifier 302 of the device 300 will be described with reference to FIG. 5. FIG. 5 illustrates an example of display of the presentation information, the display being performed by the device 300.

As illustrated in FIG. 5, the images 51 to 53 of buildings are displayed on a map on the notifier 302. Each image 51 shows, for example, the entire building and the all-unit layout of an apartment building having a plurality of units. Each image 52 shows, for example, the entire building and an all-lot layout of an office building having a plurality of units. Each image 53 also shows, for example, the entire building of a single-family detached house, which itself is one unit. The pieces of shaking-intensity information (numerical values indicating shaking intensities) for the respective units are indicated on the images 51 to 53. Although the images 51 to 53 are depicted in FIG. 5 as images representing the entire buildings in a three-dimensional manner, they may also be images representing the entire buildings in a two-dimensional manner.

As described above, according to the present embodiment, even when the user is away from a building during the occurrence of an earthquake, he or she can check the shaking intensity for each unit in the building. For example, when an earthquake occurs when the user is at a remote location on a business trip or the like, he or she can check the shaking intensities of his or her home and its vicinity or the shaking intensities of the entity for which he or she works and its vicinity, while at the remote location.

In addition, in the present embodiment, the shaking intensities of the respective units in buildings in each region during the occurrence of an earthquake may be recorded as an archive so as to allow each user to freely view the archive. This can provide the advantages described below.

Each resident can recognize the shaking intensity of his or her home, the entity for which he or she works, or the like and thus can make corresponding preparations. For example, when the shaking intensity of the home is high, each resident can prepare emergency supplies and can take measures for preventing toppling of furniture and so on, in preparation for the next earthquake.

Public institutions can recognize the shaking intensities for the respective units in buildings in their jurisdictional areas and thus can utilize the shaking intensities for administrative measures and policies. For example, when there is a building whose shaking intensity is significantly higher than that of buildings in its vicinity in the jurisdictional area, an administrative institution can create, near the building, a park that can be used as an evacuation place, can carry out improvement work for the building or the soil thereof, and can enlighten the residents near the building to enhance their disaster prevention awareness.

By recognizing the shaking intensities for the respective units in buildings in each region, each housing company (e.g., a building-construction company or a real-estate company) can utilize the shaking intensities for its own business. For example, each housing company can build a new building, avoiding regions in which there are many units whose shaking intensities are high. Also, for example, each housing company can emphasize to their clients that a quake at a building it sells is weaker and so on, when the shaking intensity of the building is lower than those of nearby buildings other companies sell.

<Modifications of Embodiment>

Although one embodiment has been described above, various changes and modifications can be made to the present disclosure without departing from the spirit and scope thereof. Modifications of the above-described embodiment will be described below.

(First Modification)

Figure 6:
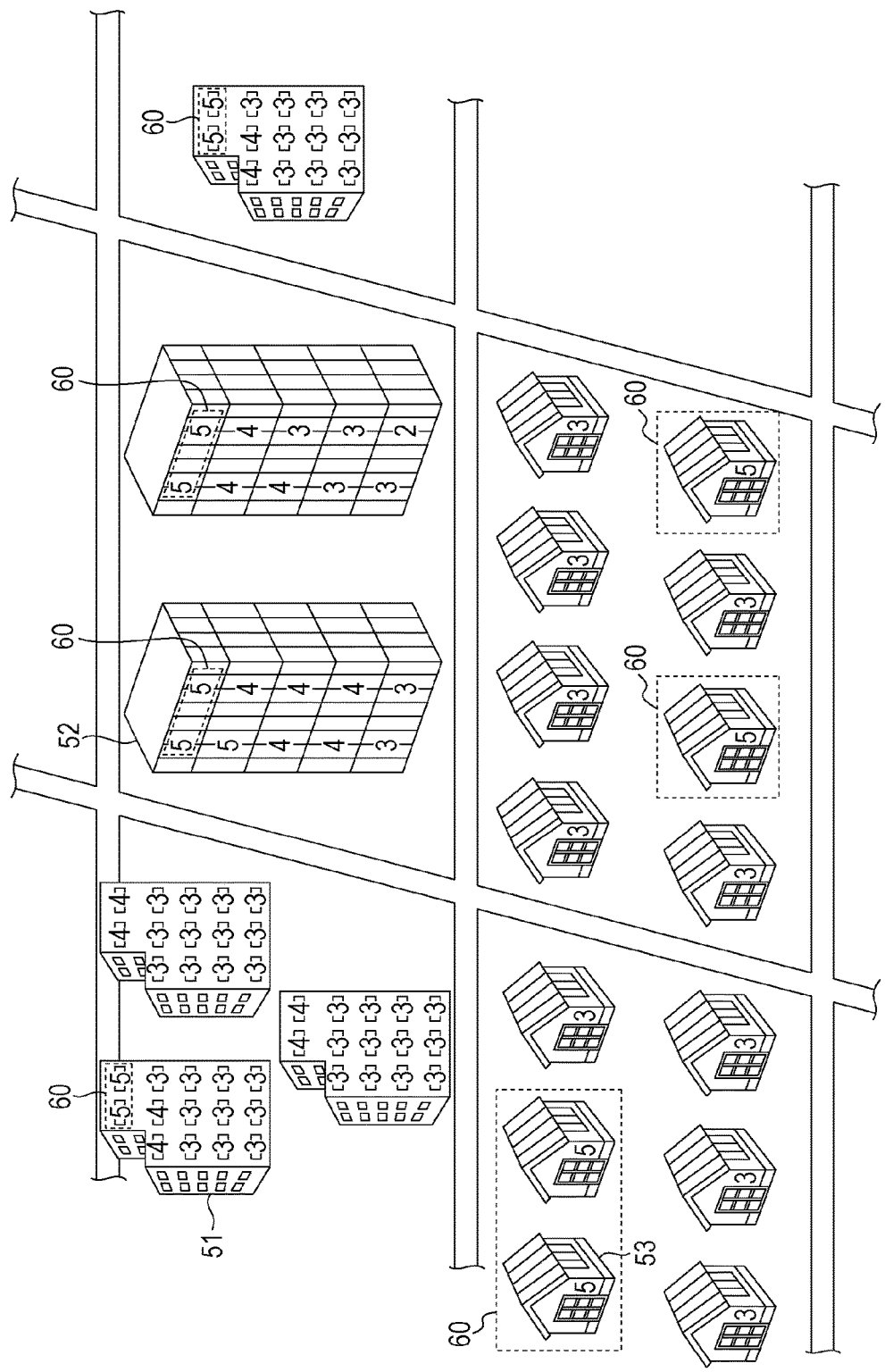
FIG. 6 is a diagram illustrating an example of display of the presentation information according to the present embodiment.

The generator 205 may also generate the presentation information so that units whose shaking-intensity information is larger than or equal to a predetermined value are displayed in a highlighted manner. FIG. 6 illustrates an example in which this presentation information is displayed on the notifier 302 of the device 300. In the example illustrated in FIG. 6, units whose shaking-intensity information indicates "5" are displayed in a highlighted manner by being surrounded by frames 60. This allows the user to recognize, at a glance, the units whose shaking intensities are high.

(Second Modification)

The calculator 204 may also determine collapse risks for respective buildings. The description below will be given of specific examples 1 to 3 for determining the collapse risks. It is assumed in this case that the collapse risks are determined for a plurality of single-family detached houses (hereinafter referred to simply as "houses") that are located in a predetermined region, as an example.

A description will now be given of specific example 1. First, the calculator 204 calculates pieces of shaking-intensity information for the respective houses, calculates shaking-center distances on the basis of the acceleration information, and registers the pieces of shaking-intensity information and pieces of information of the shaking-center distances in the storage unit 203 in association with the corresponding pieces of location information. Since the calculation method for shaking-center distances are known, a description thereof is not given herein.

Next, the generator 205 reads the pieces of location information, the shaking-intensity information, and the shaking-center distance information for the respective houses from the storage unit 203. The generator 205 then determines whether or not there is a difference in the pieces of shaking-intensity information of the houses whose pieces of shaking-center distance information are the same. As a result of this determination, with respect to each house whose shaking-intensity information is large compared with the other houses, the generator 205 determines that the strength of the building or the strength of the soil is low and the collapse risk is high.

A description will now be given of specific example 2. In this example, it is assumed that pieces of building strength information indicating the strengths of buildings are pre-registered for respective houses in association with the corresponding pieces of location information. Examples of the building strength information include earthquake-resistance strengths. For example, an administrator of the server apparatus 200 or the like pre-registers the building strength information.

The generator 205 calculates pieces of shaking-intensity information and shaking-center distances for respective houses. And the generator 205 registers the calculated pieces of shaking-intensity information and the calculated shaking-center distances in the storage unit 203, as in specific example 1 described above.

Next, the generator 205 reads the pieces of location information, shaking-intensity information, shaking-center distance information, and building strength information for the respective houses from the storage unit 203. The generator 205 then determines whether or not there is a difference in the pieces of shaking-intensity information of the houses whose pieces of shaking-center distance information are the same and whose pieces of building strength information are the same. As a result of this determination, with respect to each house whose shaking-intensity information is large compared with the other houses, the generator 205 determines that the strength of the soil is low and the collapse risk is high.

A description will now be given of specific example 3. In this example, it is assumed that pieces of soil strength information indicating the strengths of the soils are registered for respective houses in association with the corresponding pieces of location information. Examples of the soil strength information include soil amplification factors. For example, an administrator of the server apparatus 200 or the like pre-registers the soil strength information.

Next, the generator 205 reads the pieces of location information, shaking-intensity information, shaking-center distance information, and soil strength information for the respective houses from the storage unit 203. The generator 205 then determines whether or not there is a difference in the pieces of shaking-intensity information of the houses whose pieces of shaking-center distance information are the same and whose pieces of soil strength information are the same. As a result of this determination, with respect to each house whose shaking-intensity information is large compared with the other houses, the generator 205 determines that the strength of the building is low and the collapse risk is high.

Specific examples 1 to 3 of the collapse-risk determination have been described thus far.

After the determination described above, the generator 205 reads the map information and the building image information from the storage unit 203 and generates presentation information (one example of second control information) so that the pieces of the shaking-intensity information for the respective units in the buildings are displayed on a map for the predetermined region, as described in the above embodiment. In this case, the generator 205 generates the presentation information so that the location indicated by the location information of each house for which it is determined in any of specific examples 1 to 3 that the collapse risk is high is displayed in a highlighted manner. This presentation information is transmitted from the server apparatus 200 to the device 300 through the network 400 and is displayed on the notifier 302 of the device 300.

Figure 7:
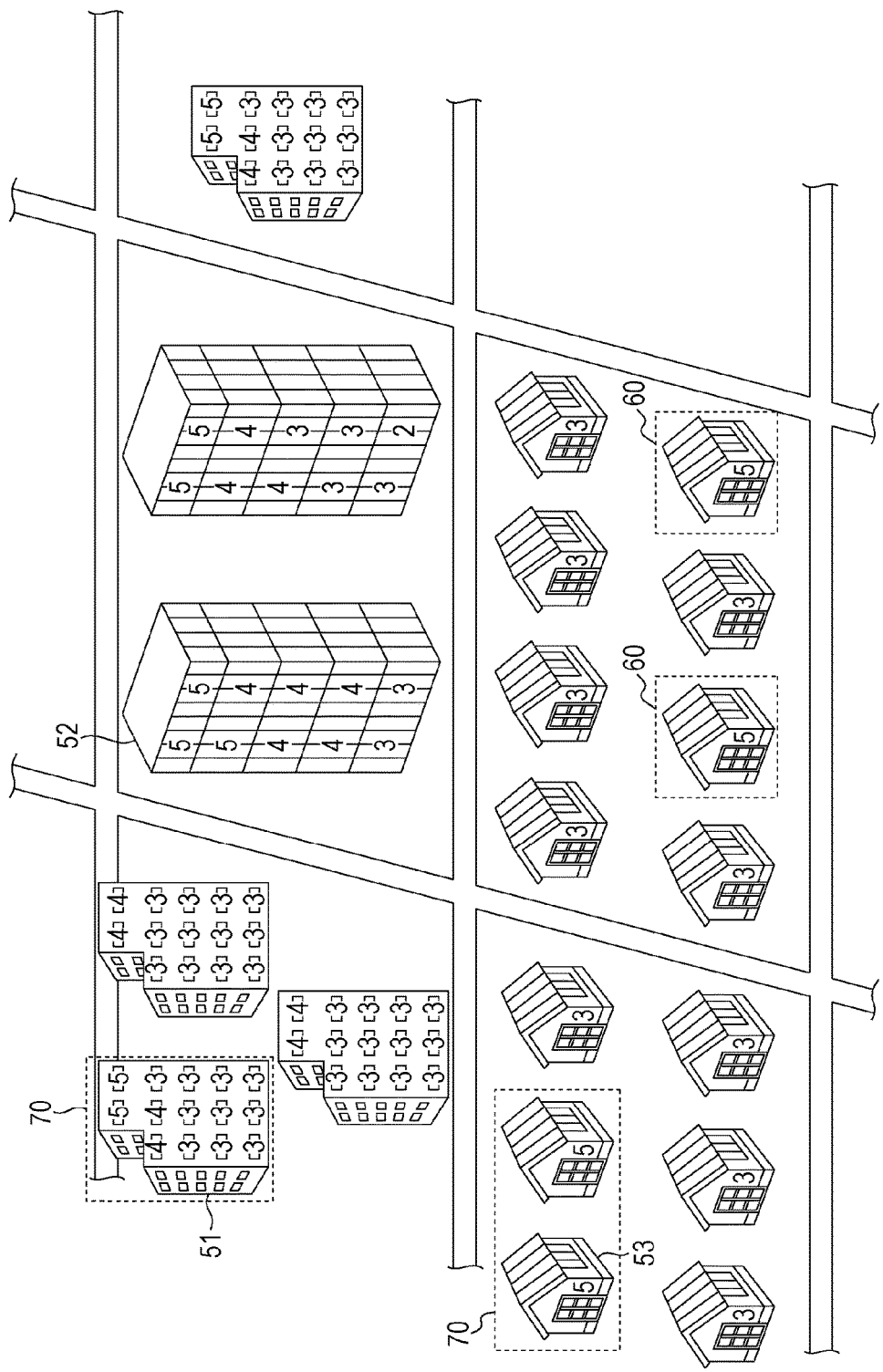
FIG. 7 is a diagram illustrating an example of display of the presentation information according to the present embodiment.

FIG. 7 illustrates an example of the presentation information displayed on the notifier 302 of the device 300. In the example illustrated in FIG. 7, the pieces of shaking-intensity information are displayed for the respective units in the buildings, and the images of the buildings for which it is determined that the collapse risks are high are displayed in a highlighted manner by being surrounded by frames 70. This allows the user to recognize, at a glance, the buildings whose collapse risks are high.

Although an example of single-family detached houses, which are each one unit itself, has been described in this modification, the determination and highlighting can also be performed for the collapse risks of apartment buildings or office buildings, which each have a plurality of units, in the manner described above.

The method for determining the collapse risks is not limited to specific examples 1 to 3 described above, and a related technology (e.g., a method disclosed in Japanese Unexamined Patent Application Publication No. 2007-278990) may also be used.

Also, although the description in this modification has been given of an example of a case in which the generator 205 determines the collapse risks on the basis of measurement results of a single earthquake (i.e., the shaking-intensity information, the shaking-center distance information, and so on), the present disclosure is not limited thereto. For example, the generator 205 may be adapted to determine the collapse risks on the basis of measurement results of a plurality of earthquakes (i.e., the shaking-intensity information, the shaking-center distance information, and so on), the measurement results being pre-stored in the storage unit 203. In addition, the generator 205 may be adapted to determine the collapse risks by using both the measurement results of a plurality of earthquakes and official earthquake information released by a meteorological agency. This makes it possible to realize a higher-accuracy collapse-risk determination.

In addition, although the description in this modification has been given of an example of a case in which the generator 205 determines the collapse risks, a determiner (not illustrated) that is different from the generator 205 may also determine the collapse risks in the manner described above.

(Third Modification)

If the server apparatus 200 does not receive the shaking-sensing result information from the predetermined device 100 even when an earthquake has occurred, there is a possibility that the building (which may be the entire building or a unit in the building) where the device 100 is installed has collapsed. In such a case, the server apparatus 200 may be adapted to present the possibility of collapse to the device 300.

For example, if the generator 205 does not receive the shaking-sensing result information from the predetermined device 100 within a predetermined time although the transmitter/receiver 201 has received official earthquake information released by a meteorological agency, the generator 205 determines that there is a possibility that the building where the device 100 is installed has collapsed. The generator 205 then generates the presentation information so that the positions of the buildings for which it is determined that there is a possibility of collapse are displayed in a highlighted manner on the map (e.g., the images of the buildings are surrounded by frames, as illustrated in FIG. 6 or 7). This presentation information may also include a message indicating that there is a possibility that the building has collapsed. This presentation information is transmitted from the server apparatus 200 to the device 300 and is displayed on the notifier 302 of the device 300.

Although the description in this modification has been given of an example of a case in which the generator 205 determines the possibility of collapse, a determiner (not illustrated) that is different from the generator 205 may also be adapted to determine the possibility of collapse in the manner described above.

(Fourth Modification)

The generator 205 may also be adapted to determine, when shaking occurs and the calculator 204 calculates the shaking-intensity information, whether or not the shaking that has occurred is due to an earthquake on the basis of the calculated shaking-intensity information and to generate the presentation information in accordance with a result of the determination. Specific examples of this modification will be described with reference to FIGS. 8 and 9A to 9E.

Figure 8:
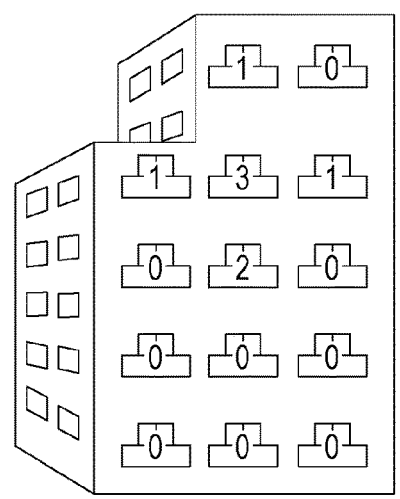
FIG. 8 is a diagram illustrating a fourth modification according to the present embodiment.

First, an example of a case in which shaking has occurred in one room in an apartment building will be described with reference to FIG. 8. In this case, the generator 205 reads, from the storage unit 203, the pieces of shaking-intensity information of individual units in an apartment building illustrated in FIG. 8 and identifies a unit whose shaking-intensity information is the largest. In the case in FIG. 8, the generator 205 identifies the unit whose shaking-intensity information is "3".

Next, the generator 205 compares the shaking-intensity information of the identified unit (hereinafter referred to as an "identified unit") with the pieces of shaking-intensity information of the units (hereinafter referred to as "surrounding units") that exist in the surroundings of the identified unit. The surrounding units are, for example, units that are adjacent to the identified unit (e.g., units located at the upper, lower, left, and right sides of the identified unit).

When a result of the comparison indicates that the number of pieces of shaking-intensity information of the surrounding units, the shaking-intensity information being smaller than the shaking-intensity information of the identified unit, is larger than or equal to a predetermined number, the generator 205 determines that the shaking that has occurred is not due to an earthquake and originated at the identified unit. For example, when the predetermined number is set to "4", the number of pieces of shaking-intensity information of the surrounding units, the shaking-intensity information being smaller than the shaking-intensity information "3" of the identified unit, is four or more in the case in FIG. 8. Accordingly, the generator 205 determines that the shaking is not due to an earthquake and has occurred at the identified unit whose shaking-intensity information is "3". Possible examples of a case in which the shaking is not due to an earthquake include a case in which a person is moving a relatively heavy object (e.g., furniture) in the identified unit, a case in which a person is doing exercise in the identified unit, and a case in which a child is playing in the identified unit.

Next, the generator 205 generates presentation information on the basis of the result of the determination. This presentation information indicates that the shaking is not due to an earthquake and indicates the identified unit where the shaking has occurred. Display of the presentation information on the notifier 302 allows the user to recognize, when shaking occurs, whether or not the shaking is due to an earthquake and also to know the source of the shaking.

When the result of the above-described comparison indicates that the number of pieces of shaking-intensity information of the surrounding units, the shaking-intensity information being smaller than the shaking-intensity information of the identified unit, is smaller than the predetermined number (e.g., the pieces of shaking-intensity information of the surrounding units located at the left and right sides of the identified unit are the same as the shaking-intensity information of the identified unit), the generator 205 determines that the shaking that has occurred is due to an earthquake. In this case, the generator 205 generates either the presentation information described in the above embodiment or the presentation information described in the second modification.

Next, an example of a case in which shaking has occurred at a plurality of single-family detached houses along a road will be described with reference to FIGS. 9A to 9E. Now, a case in which single-family detached houses (hereinafter referred to simply as "houses") are located along a road and a vehicle, such as a truck, passes on the road to thereby cause shaking at the houses will be described as an example.

It is desirable that devices having the acceleration sensors 101 be installed outside the respective houses.

Alternatively, it is desirable that the server apparatus 200 determine whether or not shaking that has occurred is due to an earthquake, for example, by using the shaking-intensity information corresponding to a shaking intensity calculated based on the shaking-sensing result information transmitted from the device installed outside each house. In this case, it is desirable that the server apparatus 200 manage information regarding the place where each device is installed.

This is because the devices installed outside houses can easily detect shaking caused by passage of a truck on a road, compared with the devices installed inside houses.

The "device installed outside a house" is, for example, battery equipment, such as a battery, installed outside a house.

FIGS. 9A to 9C are schematic views illustrating, in a time series, a state in which a truck 91 travels on a road 90. The truck 91 travels from right to left in FIGS. 9A to 9C. A group of houses 92 is built along the road 90, and a group of houses 93 is built adjacent to the group of houses 92. A region in which the groups of houses 92 and 93 exist is assumed to be a predetermined region.

In this case, when the truck 91 passes near the group of houses 92, as illustrated in FIGS. 9A to 9C, the shaking-intensity information of the group of houses 92 is calculated to be higher than the shaking-intensity information of the group of houses 93 (or the shaking-intensity information of the group of houses 93 is calculated to be lower than the shaking-intensity information of the group of houses 92).

This is because the distance between the houses in the group of houses 93 and the road 90 is larger than the distance between the houses in the group of houses 92 and the road 90. The shaking that occurs when the truck 91 passes on the road 90 decays when the shaking is transmitted on the road 90 and the ground surface between the road 90 and the houses in the group of houses 92. The larger the distance between the road 90 and the houses is, the larger the degree of the decay of the shaking is.

The houses in the group of houses 92 are located closer to the road 90 than the houses in the group of houses 93. Thus, the shaking detected by the devices 100 (specifically, the acceleration sensors 101) installed in the houses in the group of houses 92 becomes greater than shaking detected by the devices 100 (specifically, the acceleration sensors 101) installed in the houses in the group of houses 93.

Thus, the shaking-sensing result information (specifically, the shaking-detection results included in the acceleration information (e.g., the magnitudes of the shaking)) transmitted from the devices 100 installed in the houses in the group of houses 92 to the server apparatus 200 becomes larger than the shaking-sensing result information transmitted from the devices 100 installed in the houses in the group of houses 93.

Accordingly, the shaking-intensity information of the group of houses 92 which is calculated by the server apparatus 200 becomes higher than the shaking-intensity information of the group of houses 93.

The server apparatus 200 has a feature in that it utilizes a difference in the pieces of shaking-intensity information of the groups of houses 92 and 93, the pieces of shaking-intensity information being calculated as described above, to determine whether or not shaking that has occurred in the group of houses 92 and 93 is due to an earthquake.

First, the generator 205 detects a change in the pieces of shaking-intensity information of houses in a predetermined region at a predetermined time (e.g., the time at which the truck 91 passes) and determines whether or not both a house (hereinafter referred to as a "first house") whose shaking-intensity information changes by a value larger than or equal to a predetermined value and a house (hereinafter referred to as a "second house") whose shaking-intensity information changes by a value smaller than the predetermined value exist.

When a result of the determination indicates that the first house and the second house do not exist in the predetermined region at the same time (e.g., all houses in the predetermined region correspond to either the first house or the second house), the generator 205 determines that the shaking that has occurred is due to an earthquake. In this case, the generator 205 generates either the presentation information (one example of the third control information) described in the above embodiment or the presentation information (one example of the second control information) described above in the second modification.

On the other hand, when the result of the determination indicates that both the first house and the second house exist in the predetermined region, the generator 205 determines that the shaking that has occurred is not due to an earthquake and is due to an external environmental factor of the first house (e.g., due to passage of a truck). For example, when the predetermined value is set to "2", the group of houses 92 (one example of the first house) whose shaking-intensity information changes by a value larger than or equal to the predetermined value "2" exists in the case in FIGS. 9A to 9C, and the group of houses 93 (one example of the second house) whose shaking-intensity information changes by a value smaller than the predetermined value "2" exists. Accordingly, the generator 205 determines that the shaking is not due to an earthquake and has occurred due to an external environmental factor of the group of houses 92.

Next, the generator 205 generates presentation information on the basis of the result of the determination. This presentation information is information (one example of first control information) indicating that shaking is not due to an earthquake and indicating the first house (e.g., the group of houses 92) at which the shaking has occurred.

Figure 9D:
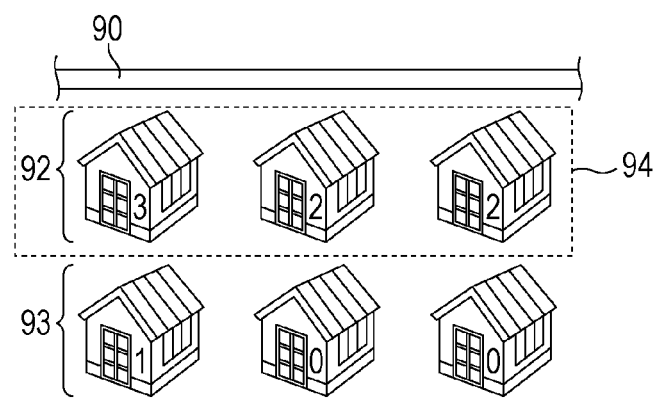
FIG. 9D is a schematic view illustrating the fourth modification according to the present embodiment.

FIG. 9D illustrates an example in which this presentation information is displayed on the notifier 302 of the device 300. In the example in FIG. 9D, the group of houses 92 whose shaking-intensity information has changed at a value larger than or equal to the predetermined value is displayed in a highlighted manner by being surrounded by a frame 94. A message (not illustrated) indicating that the shaking is not due to an earthquake is also displayed together with the image illustrated in FIG. 9D. Thus, when shaking occurs, the user can recognize whether or not it is due to an earthquake and can also know the source of the shaking.

Figure 9E:
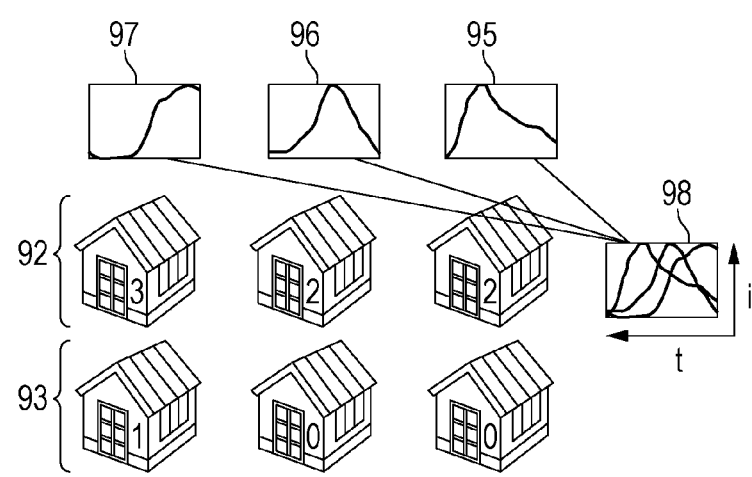
FIG. 9E is a schematic view illustrating the fourth modification according to the present embodiment.

An image showing that shaking has occurred in a time series may also be displayed in addition to the image illustrated in FIG. 9D. FIG. 9E illustrates an example of such an arrangement. In FIG. 9E, images 95 to 97 are graphs showing, in a time series, changes in the shaking-intensity information, with the vertical axis indicating shaking intensity (i) and the horizontal axis indicating time (t). When changes in the shaking-intensity information are detected, the generator 205 generates the images 95 to 97 showing the changes in the shaking-intensity information for each house in the group of houses 92. Next, the generator 205 combines the images 95 to 97 to generate an image 98 and includes the image 98 in the above-described presentation information. Thus, when the presentation information is displayed at the device 300, the image 98 is displayed together with the image illustrated in FIG. 9D. By seeing the image 98, the user can recognize the state in which the peak of the shaking changes with time.

Although this modification has been given of a case in which the generator 205 determines whether or not the shaking that has occurred is due to an earthquake on the basis of the shaking-intensity information calculated by the calculator 204, the determination method is not limited thereto. For example, the generator 205 may determine whether or not the shaking that has occurred is due to an earthquake, by using only official earthquake information released by a meteorological agency or by using the earthquake information together with the shaking-intensity information calculated by the calculator 204.

In addition, for example, the server apparatus 200 or the device 100 may have a traveling-history acquirer (not illustrated) that acquires the traveling history of vehicles from an external server. This external server is, for example, a server that obtains and accumulates information regarding traveling routes, traveling times, and so on that a global positioning system (GPS) has obtained from vehicles or a server that obtains and accumulates information from sensors or the like that are installed on roads, utility poles, traffic lights, and so on and that obtain information regarding traveling of vehicles. When the vehicle traveling histories corresponding to individual locations have been obtained and accumulated in the external server in the manner described above, the traveling-history acquirer can acquire the traveling history of all vehicles that have passed within a predetermined region from the location where the device 100 is installed. With this arrangement, when there is history indicating that a vehicle has traveled in the vicinity of the device 100 when shaking occurred, it is possible to decide that the shaking is due to the traveling of the vehicle and is not due to an earthquake.

Also, a determination as to whether or not the shaking is due to an earthquake may be made through analysis of information about the shaking. Examples of the information about the shaking include a frequency and the time from the time point when the shaking started to the time point when it stopped. For example, when the frequency is higher than or equal to (or is lower than or equal to) a predetermined frequency, it may be decided that the shaking is not due to an earthquake. Also, for example, when the time from the time point when the shaking started to the time point when it stopped is smaller than or equal to (or larger than or equal to) a predetermined time, it may be decided that the shaking is not due to an earthquake. This makes it possible to eliminate apparent noise other than shaking due to an earthquake and makes it possible to reduce false detection.

In addition, although the description in this modification has been given of an example of a case in which the generator 205 determines whether or not the shaking that has occurred is due to an earthquake, a determiner (not illustrated) that is different from the generator 205 may also be adapted to make the determination in the manner described above.

(Fifth Modification)

The generator 205 may also generate, for each unit in a building, presentation information indicating the rate of decay of shaking per predetermined time (e.g., the magnitude of a change with time in the shaking intensity). A specific example of this modification will be described below. For example, the generator 205 calculates, for each unit in a building, the rate of decay on the basis of shaking-intensity information m at time t and shaking-intensity information m' at time t' (t'>t). For example, the rate of decay is calculated using (m'−m)/(t'−t). A smaller value of the rate of decay indicates that the quake is less likely to die down. The generator 205 then generates presentation information so that, for each unit in a building, a value indicating the calculated rate of decay is displayed on the map for a predetermined region singularly or together with the shaking-intensity information. In this case, the generator 205 may also generate presentation information so that each building unit whose rate of decay is higher than or equal to a predetermined value or is lower than the predetermined value is displayed in a highlighted manner (e.g., by surrounding the image of the building unit with a frame). Thus, according to this modification, the user can recognize whether or not it is easy for a quake to die down for each unit in a building.

(Sixth Modification)

The controller 103 in the device 100 may also execute the calculation of the shaking-intensity information and/or the determination of the collapse risk by using a method that is similar to that executed by the server apparatus 200 described above. In this case, information indicating a result of the execution, together with the device ID, is transmitted from the device 100 to the server apparatus 200 and is used for the presentation-information generation performed by the server apparatus 200.

(Seventh Modification)

The acceleration sensors 101 may not only be built into the critical infrastructure equipment, but also be installed on, for example, traffic lights, streetlights, road signs, guardrails, and billboards.

(Eighth Modification)

The sensor that is included in the device 100 to detect shaking is not limited to the acceleration sensors 101. For example, a seismic sensor or a shaking sensor may also be included in the device 100.

(Ninth Modification)

Although the description in the above embodiment has been given of an example of a case in which an address is used as an example of the location information and one unit in a unit ownership building is identified based on the address and the all-unit layout, the present disclosure is not limited thereto. For example, GPS information may be used as the location information so as to allow one unit in a unit ownership building to be identified based on the GPS information and height information indicating the height of each pre-registered building.

Modifications of the present embodiment have been described thus far. The modifications described above may be arbitrarily combined together.

<Example Realized by Computer Program>

While the embodiment according to the present disclosure has been described above in detail with reference to the accompanying drawings, the functions of the above-described devices 100 and 300 and the server apparatus 200 (each of which is hereinafter referred to as "each apparatus") can be realized by a computer program.

Figure 10:
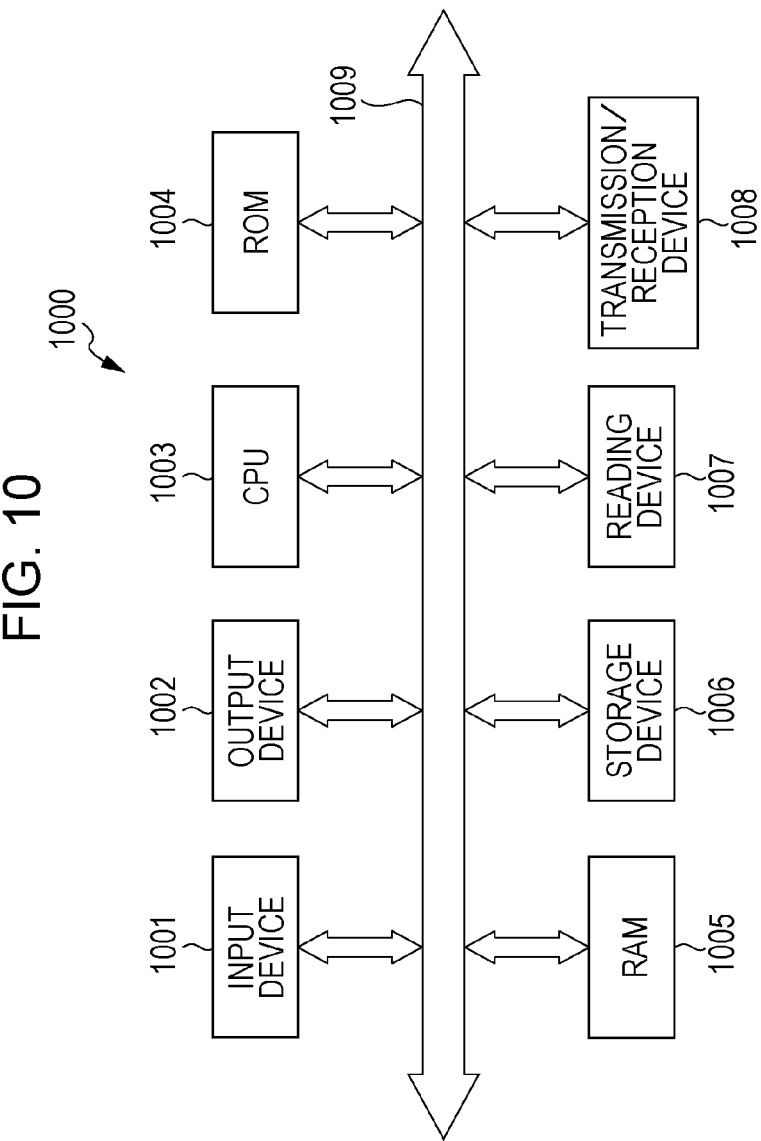
FIG. 10 is a diagram illustrating one example of a hardware configuration of a computer that realizes the functions of the devices and the server apparatus according to the present embodiment by using software.

FIG. 10 is a diagram illustrating a hardware configuration of a computer that realizes the functions of the constituent elements by using a program. This computer 1000 includes an input device 1001, such as an input button and/or a touch pad, an output device 1002, such as a display and/or a speaker, a central processing unit (CPU) 1003, a read only memory (ROM) 1004, a random access memory (RAM) 1005, a storage device 1006, such as a hard-disk device or a solid-state drive (SSD), a reading device 1007 for reading information from a storage medium, such as a digital versatile disk read-only memory (DVD-ROM) or a Universal Serial Bus (USB) memory, and a transmission/reception device 1008 for performing communication through a network. These elements are connected through a bus 1009.

The reading device 1007 reads a program for realizing the functions of the aforementioned elements from a storage medium storing the program, and then the program is stored in the storage device 1006. Alternatively, the transmission/reception device 1008 communicates with a server apparatus, connected to the network, to download the program for realizing the functions of the aforementioned elements from the server apparatus, and the program is stored in the storage device 1006.

The CPU 1003 then copies the program, stored in the storage device 1006, to the RAM 1005, sequentially reads instructions included in the program from the RAM 1005, and executes the instructions to thereby realize the functions of the elements. During execution of the program, information obtained in the various types of processing described above in the embodiment is stored in the RAM 1005 or the storage device 1006 and is used as appropriate.

The hardware configuration of the computer that realizes the functions of each apparatus by using a program has been described in the above example. However, the present disclosure is not limited to the above-described configuration. For example, any of the functions of each apparatus may be implemented by, for example, dedicated hardware (a processing circuit).

It goes without saying that all of the functions of each apparatus may be implemented by, for example, dedicated hardware (a processing circuit). Examples of the dedicated hardware include an application-specific integrated circuit (ASIC) and a field programmable gate array (FPGA).

<Types of Cloud Service>

The technology described in the above embodiment can be realized, for example, by the following types of cloud service. However, the types of service for which the technology described in the above embodiment is realized are not limited to the types described below.

(Service Type 1: Inhouse Data Center Type)

Figure 11:
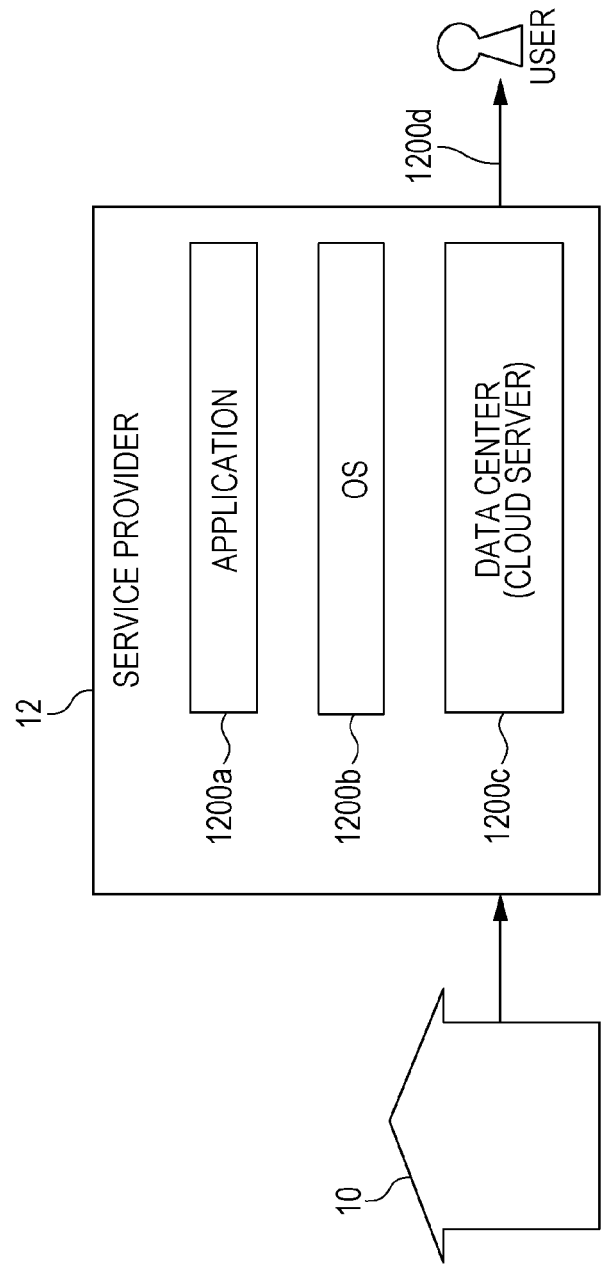
FIG. 11 is a diagram illustrating service type 1 (an inhouse data center type)

FIG. 11 is a diagram illustrating service type 1 (an inhouse data center type). This type is a type in which a service provider 12 obtains information from a group 10 and provides a user with a service. In this type, the service provider 12 has functions of a data-center operating company. That is, the service provider 12 has a cloud server 11a that manages big data. Thus, no data-center operating company exists.

In this type, the service provider 12 operates and manages a data center 1200c (the cloud server 11a). The service provider 12 manages an operating system (OS) 1200b and an application 1200a. The service provider 12 uses the OS 1200b and the application 1200a, managed by the service provider 12, to provide a service 1200d.

(Service Type 2: IaaS Usage Type)

Figure 12:
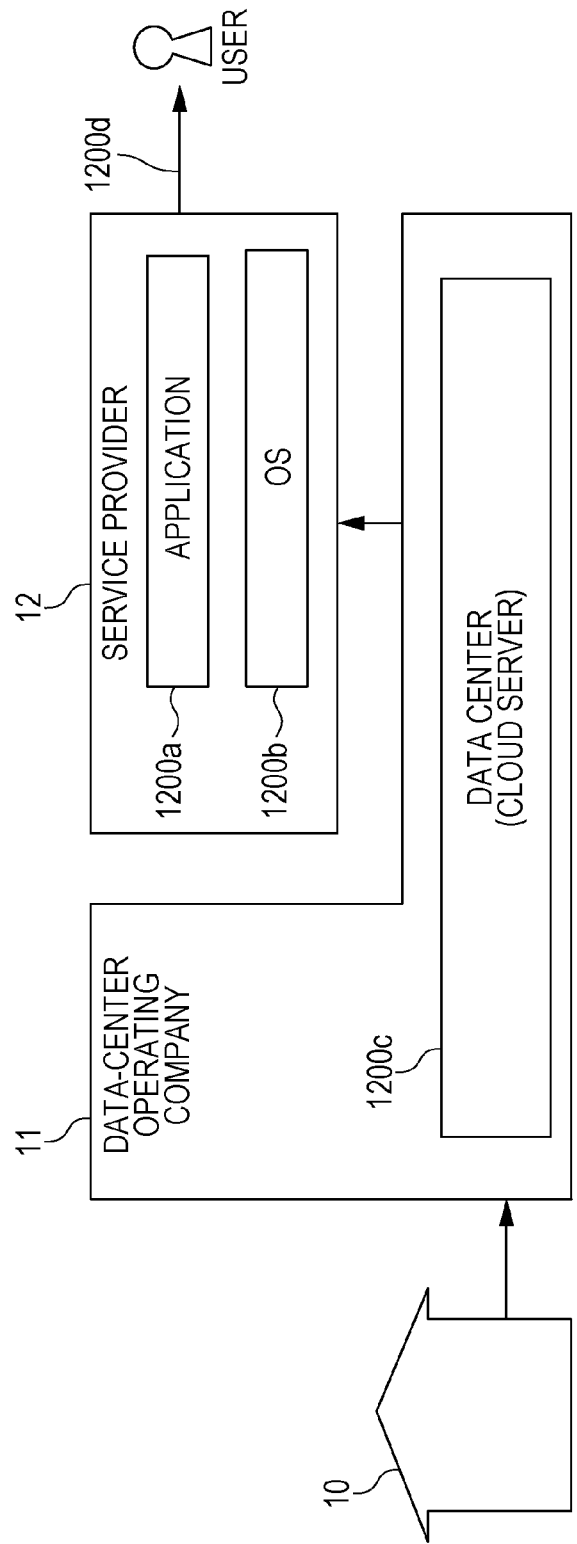
FIG. 12 is a diagram illustrating service type 2 (an IaaS usage type)

FIG. 12 is a diagram illustrating service type 2 (an IaaS usage type). IaaS is an acronym of Infrastructure as a Service and is a cloud-service-providing model that provides, as a service over the Internet, infrastructure itself for constructing and operating a computer system.

In this, type, a data-center operating company operates and manages a data center 1200c (corresponding to the cloud server 11a). A service provider 12 manages an OS 1200b and an application 1200a. The service provider 12 uses the OS 1200b and the application 1200a, managed by the service provider 12, to provide a service 1200d.

(Service Type 3: PaaS Usage Type)

Figure 13:
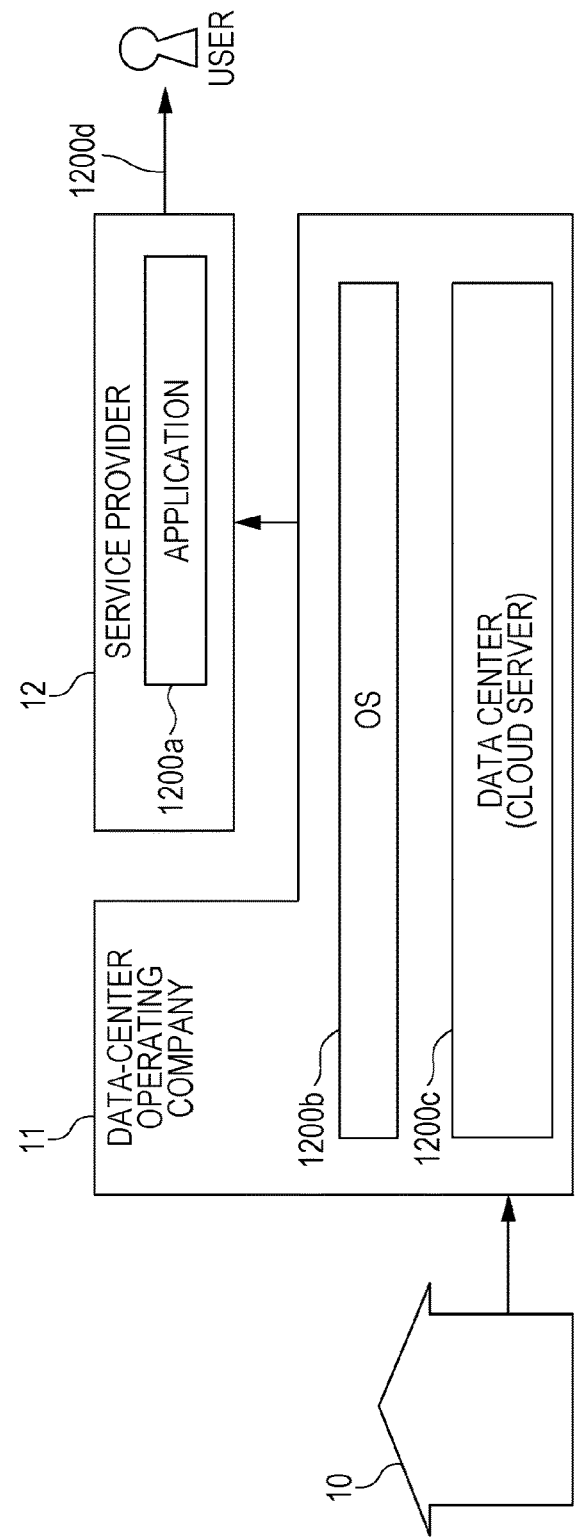
FIG. 13 is a diagram illustrating service type 3 (a PaaS usage type)

FIG. 13 is a diagram illustrating service type 3 (a PaaS usage type). PaaS is an acronym of Platform as a Service and is a cloud-service-providing model that provides, as a service over the Internet, a platform that serves as a foundation for constructing and operating software.

In this type, a data-center operating company 11 manages an OS 1200b and operates and manages a data center 1200c (corresponding to the cloud server 11a. A service provider 12 manages an application 1200a. The service provider 12 uses the OS 1200b, managed by the data-center operating company 11, and the application 1200a, managed by the service provider 12, to provide a service 1200d.

(Service Type 4: SaaS Usage Type)

Figure 14:
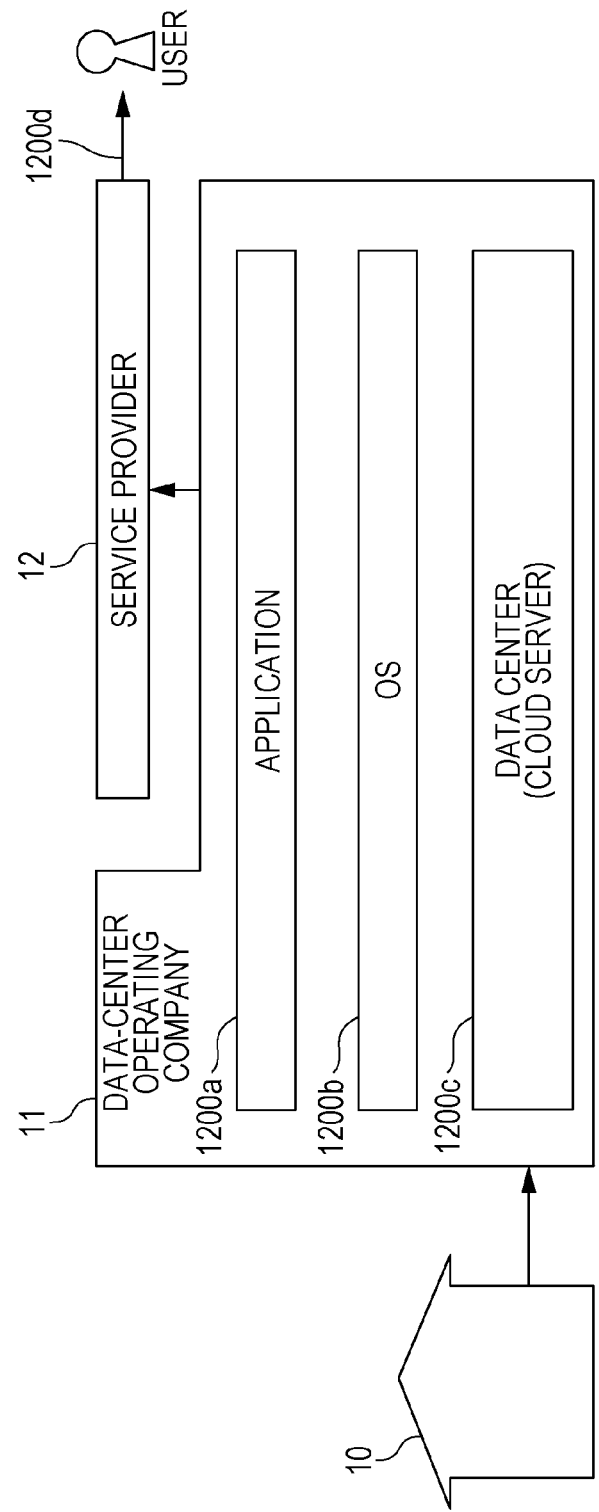
FIG. 14 is a diagram illustrating service type 4 (a SaaS usage type).

FIG. 14 is a diagram illustrating service type 4 (a SaaS usage type). SaaS is an acronym of Software as a Service. SasS is a cloud-service-providing model having, for example, a function that allows companies and individuals (users) that do not own a data center (a cloud server) to use, over a network such as the Internet, applications provided by a platform provider that owns a data center (a cloud server).

In this type, a data-center operating company 11 manages an application 1200a and an OS 1200b and operates and manages a data center 1200c (corresponding to the cloud server 11a). The service provider 12 uses the OS 1200b and the application 1200a, managed by the data-center operating company 11, to provide a service 1200d.

It is assumed that, in any of the types described above, the service provider 120 provides a service. Also, for example, the service provider or the data-center operating company may itself develop the OS, the application, a database for big data, or the like or may also outsource the development to a third party.

The present disclosure is useful for a server apparatus that aids users' reservation for a service provider, an information presentation method, and a storage medium storing a computer program.

What is claimed is:

1. A server apparatus comprising:
   a transmitter that transmits, to a terminal device through a network, control information to control screen display of the terminal device;
   a processor; and
   a memory that stores instructions that, when executed by the processor, cause the processor to execute:
     reading, from a storage device, map information of a predetermined region, location information indicating a location of at least one unit representing an occupied part in a unit ownership building that exists in the predetermined region or a building that exists in the predetermined region and that is a building other than a unit ownership building, and shaking-intensity information indicating a shaking intensity for each unit, the shaking intensity being calculated based on a shaking-detection result obtained by a sensor installed at each unit;
     determining whether or not shaking that has occurred is due to an earthquake, based on the shaking-intensity information;
     determining, upon determining that the shaking is not due to an earthquake, a unit where the shaking has occurred, based on the shaking-intensity information;
     determining, upon determining that the shaking is due to an earthquake, a building whose collapse risk is high, based on the shaking-intensity information; and
     generating second control information, based on the map information, the location information, and the shaking-intensity information read from the storage device and information about the building whose collapse risk is high,
   wherein the transmitter transmits, to the terminal device, the second control information as the control information,
   wherein the screen display of the terminal device is controlled based on the second control information transmitted as the control information, and
   wherein the screen display of the terminal device includes the map information, the information about the at least one unit representing the occupied part or the building, the shaking-intensity information for each unit, and the information about the building whose collapse risk is high.

2. The server apparatus according to claim 1,
   wherein the instructions further cause the processor to execute:
     generating third control information based on the map information, the location information and the shaking-intensity information read from the storage, upon determining that the shaking is due to an earthquake,
   wherein the transmitter transmits, to the terminal device, the third control information as the control information;
   wherein the screen display of the terminal device is controlled based on the third control information transmitted as the control information, and
   wherein the screen display of the terminal device includes the map information, the information about the at least one unit representing the occupied part or the building, and the shaking-intensity information for each unit.

3. The server apparatus according to claim 1,
   wherein, the instructions further cause the processor to execute:
     determining, upon determining that the shaking is not due to an earthquake, that a first unit is the unit where the shaking has occurred, when a first shaking intensity calculated for the first unit is higher than a second shaking intensity calculated for a second unit that exists in surroundings of the first unit.

4. The server apparatus according to claim 1, further comprising:
   a receiver that receives shaking-detection result information indicating the shaking-detection result for each unit through the network,
   wherein the instructions further cause the processor to execute:
     calculating the shaking intensity for each unit, based on the shaking-detection result information.

5. The server apparatus according to claim 1,
   wherein the screen display includes information indicating a magnitude of a change with time in the shaking intensity for each unit.

6. The server apparatus according to claim 1,
wherein the instructions further cause the processor to execute:
generating first control information based on a result of the unit determination,
wherein the transmitter transmits, to the terminal device, the first control information as the control information,
wherein the screen display of the terminal device is controlled based on the first control information transmitted as the control information, and
wherein the screen display of the terminal device includes information indicating that the shaking is not due to an earthquake and information about the unit where the shaking has occurred.

7. An information presentation method, comprising:
reading, using a processor and from a storage device, map information of a predetermined region, location information indicating a location of at least one unit representing an occupied part in a unit ownership building that exists in the predetermined region or a building that exists in the predetermined region and that is a building other than a unit ownership building, and shaking-intensity information indicating a shaking intensity for each unit, the shaking intensity being calculated based on a shaking-detection result obtained by a sensor installed at each unit;
determining, using the processor, whether or not shaking that has occurred is due to an earthquake, based on the shaking-intensity information;
determining, using the processor, a unit where the shaking has occurred, based on the shaking-intensity information, upon determining that the shaking is not due to an earthquake;
generating, using the processor, first control information based on a result of the unit determination;
determining, using the processor, upon determining that the shaking is due to an earthquake, a building whose collapse risk is high, based on the shaking-intensity information;
generating, using the processor, second control information, based on the map information, the location information, and the shaking-intensity information read from the storage device and information about the building whose collapse risk is high; and
transmitting, using the transmitter, to the terminal device, the second control information,
wherein the screen display of the terminal device is controlled based on the second control information, and
wherein the screen display of the terminal device includes the map information, the information about the at least one unit representing the occupied part or the building, the shaking-intensity information for each unit, and the information about the building whose collapse risk is high.

8. The information presentation method according to claim 7, further comprising:
transmitting, using a transmitter, the first control information to control screen display of a terminal device to the terminal device through a network,
wherein the screen display of the terminal device is controlled based on the first control information, and
wherein the screen display of the terminal device includes information indicating that the shaking is not due to an earthquake and information about the unit where the shaking has occurred.

9. A non-transitory storage medium storing a computer-readable computer program, the program causing a computer to execute;
reading, from a storage device, map information of a predetermined region, location information indicating a location of at least one unit representing an occupied part in a unit ownership building that exists in the predetermined region or a building that exists in the predetermined region and that is a building other than a unit ownership building, and shaking-intensity information indicating a shaking intensity for each unit, the shaking intensity being calculated based on a shaking-detection result obtained by a sensor installed at each unit;
determining whether or not shaking that has occurred is due to an earthquake, based on the shaking-intensity information;
determining, upon determining that the shaking is not due to an earthquake, a unit where the shaking has occurred, based on the shaking-intensity information;
generating first control information based on a result of the unit determination; and
transmitting, to a terminal device through a network, the first control information to control screen display of the terminal device,
wherein, screen display of the terminal device is controlled based on the first control information, and
wherein the program further causes the computer to execute:
determining, upon determining that the shaking is due to an earthquake, a building whose collapse risk is high, based on the shaking-intensity information;
generating second control information, based on the map information, the location information, and the shaking-intensity information read from the storage device and information about the building whose collapse risk is high; and
transmitting, to the terminal device, the second control information,
wherein the screen display of the terminal device is controlled based on the second control information, and
wherein the screen display of the terminal device includes the map information, the information about the at least one unit representing the occupied part or the building, the shaking-intensity information for each unit, and the information about the building whose collapse risk is high.

10. The non-transitory storage medium according to claim 9, wherein the screen display of the terminal device includes information indicating that the shaking is not due to an earthquake and information about the unit where the shaking has occurred.

* * * * *